J. E. WEST.
Corn Planter.
No. 62,458.
Patented Feb. 26, 1867.
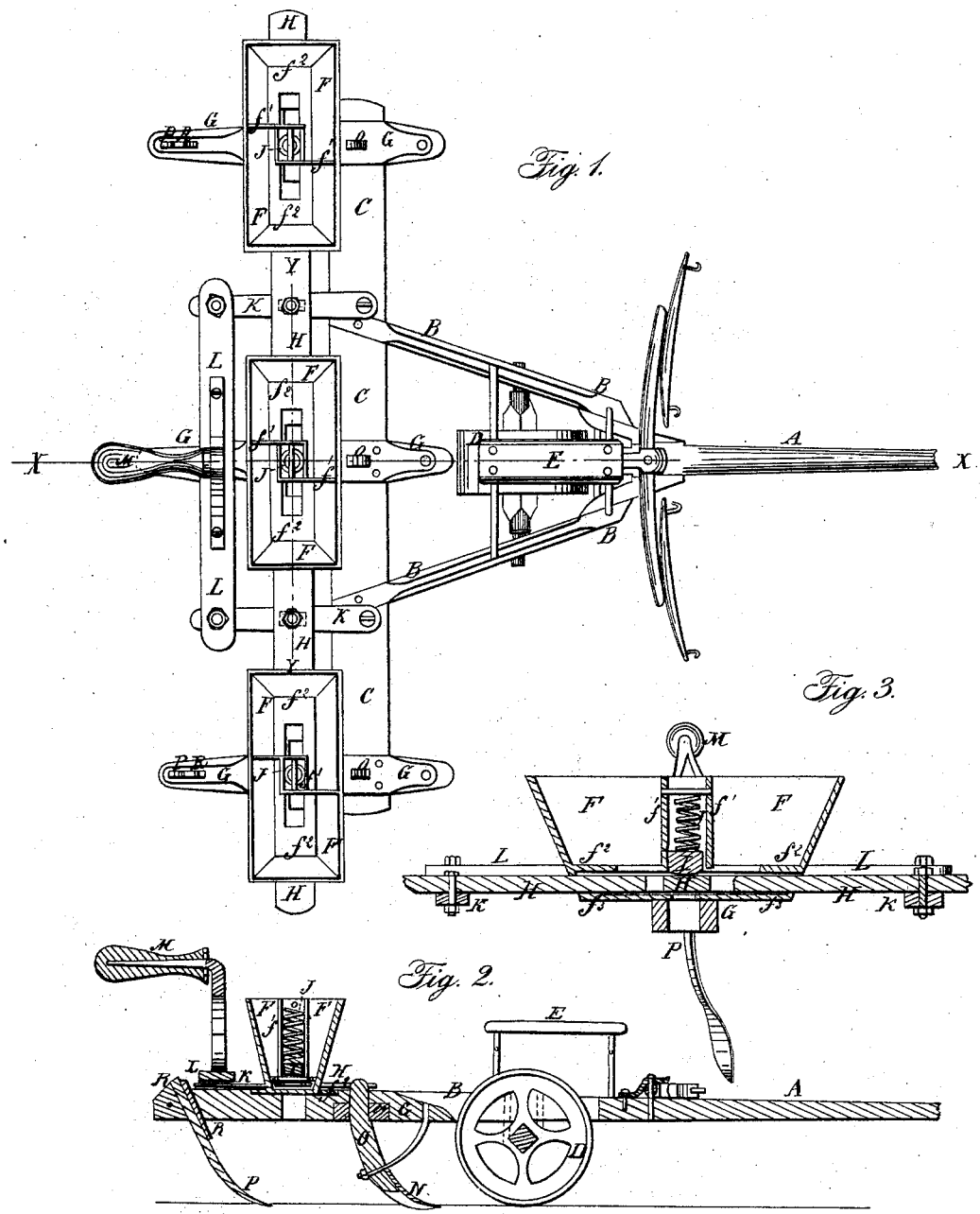
Witnesses:
Theo Fuscke
Wm Truan
Inventor:
Jos E West
Per Munn & Co
Attorneys

United States Patent Office.

JOSEPH E. WEST, OF GEORGETOWN, KENTUCKY.

*Letters Patent No. 62,458, dated February 26, 1867.*

IMPROVEMENT IN CORN PLANTERS.

*The Schedule referred to in these Letters Patent and making part of the same.*

TO ALL WHOM IT MAY CONCERN:

Be it known that I, JOSEPH E. WEST, of Georgetown, in the county of Scott, and State of Kentucky, have invented a new and improved Corn Planter; and I do hereby declare that the following is a full, clear, and exact description thereof, which will enable others skilled in the art to make and use the same, reference being had to the accompanying drawings, forming part of this specification, in which—

Figure 1 is a top or plan view of my improved corn planter.

Figure 2 is a sectional view of the same, taken through the line $x\ x$, fig. 1.

Figure 3 is a detail sectional view of the same, taken through the line $y\ y$, fig. 1.

Similar letters of reference indicate like parts.

My invention has for its object to furnish a machine by means of which three rows of corn may be marked out, and the corn dropped and covered at one operation; and it consists in the combination of the sliding valve-bar, operating levers, and handle with each other and with the seed-boxes, the combination of the blocks and springs with the seed-boxes and with the sliding-valve bar, and in the general combination and arrangement of the parts, the whole being constructed and arranged as hereinafter more fully described.

A is the tongue of the machine, which is attached to the draught-bars B in the ordinary manner. The rear ends of the draught-bars B are secured to the frame C of the machine; and between them is pivoted the broad wheel or roller D, as shown in figs. 1 and 2. E is the driver's seat, which is attached to the draught-bars B, and which is made long, so that the driver, by shifting his position upon it, may vary the depth at which the plough runs. If desired, the seat E may be made sliding, so that the driver may change his position by sliding the seat back and forth. F are the seed-boxes, which are made hopper-shaped, as shown in the drawings, and which are placed directly over and are attached to the beams G. The seed-boxes F are divided into two equal parts by partitions $f^1$, which said partitions are so constructed as to have vertical chambers formed in them directly over the discharging orifices of said hoppers or seed-boxes F. The seed-boxes F are made with double bottoms, $f^2$ and $f^3$, between which the sliding-valve bar H works. The upper bottom $f^2$ is slotted longitudinally to allow the corn to have a free passage into the valves of the bar H; and the lower bottom $f^3$ has a hole formed through it directly beneath the centre of the seed-box, and directly over the hole through the beams G, through which the seed drops to the ground. The bar H extends across the entire breadth of the machine, and works back and forth between the bottoms $f^2$ and $f^3$ of the seed-boxes F. The bar H has two holes or valves formed through it within each seed-box, which holes are so arranged that, as the said bar is operated, they may pass alternately over the discharging orifice through the bottom $f^3$. I are blocks, fitting into the chambers formed in the partitions $f^1$, and which are of such a size that they cannot pass down into the holes or valves of the bar H. The blocks I may be made of wood and bound with iron; and they are designed to push the grains of corn off the bar H as the filled valve comes over the discharging orifice. J are coiled wire springs, the lower ends of which rest upon the upper sides of the blocks I, and their upper ends rest against a pin or other support passing through or secured to the upper ends of the chambers, in which the blocks I and springs J are placed. The object of the springs J is to allow the blocks I to give, so as to avoid crushing the grains of corn as the slide-bar H is operated. K are levers, the forward ends of which are pivoted to the frame C, as shown in fig. 1, and the middle parts of which are pivoted to the sliding-bar H by bolts passing through said bar, and through slots in the lever K. The rear ends of the levers K are pivoted to the ends of the bar L, to which the handle M, by which the bar H is operated, is attached; or, if desired, the handle M may be attached directly to the ends of the levers K. The marks or furrows in which the corn is dropped are formed by the shovel ploughs N, secured to the lower ends of the uprights O, the upper ends of which are secured to the beams G directly in front of the discharging orifice of the seed-boxes F. P are the bull-tongues that cover the corn. The bull-tongues P are formed with a long iron shank, by means of which they are adjustably secured to the rear parts of the beams G by the keys R, so that they may be so adjusted as to cover the corn to any desired depth. The shanks of the bull-tongues P are bent to one side, so that they may run at the side of the marks or furrows formed by the ploughs N, and cover the corn without disturbing its position. The planter is guided and the horses driven by a boy sitting upon the seat E; and the dropping device is operated by a man walking in the rear of the machine. By removing the shovel ploughs N, or the bull-tongues P, the machine may be conveniently used for marking off the ground before planting, so that the corn may be planted in check-row.

What I claim as new, and desire to secure by Letters Patent, is—

1. The combination of the sliding-valve bar H, operating levers K, and handle M, with each other, and with the seed-boxes F, substantially as herein shown and described.

2. The combination of the blocks I and springs J with the seed-boxes F, and with the sliding-valve bar H, substantially as herein shown and described, and for the purposes set forth.

3. An improved corn planter, formed by the combination and arrangement of the roller or wheel D, draught-bars B, frame C, seed-boxes F, springs J, blocks I, sliding-valve bar H, levers K, handle M, beams G, uprights O, shovel ploughs N, and bull-tongues or coverers P, with each other, substantially as herein shown and described.

4. Forming the bull-tongues P with long bent iron shanks, and adjustably securing them to the beams G by the keys R, substantially as herein shown and described.

JOSEPH E. WEST.

Witnesses:
G. F. ALEGAIN,
W. H. FITZGERALD.